United States Patent [19]

Williams

[11] Patent Number: 5,347,481
[45] Date of Patent: Sep. 13, 1994

[54] METHOD AND APPARATUS FOR MULTIPLYING DENORMALIZED BINARY FLOATING POINT NUMBERS WITHOUT ADDITIONAL DELAY

[75] Inventor: Ted Williams, Los Gatos, Calif.

[73] Assignee: HaL Computer Systems, Inc., Campbell, Calif.

[21] Appl. No.: 989,707

[22] Filed: Feb. 1, 1993

[51] Int. Cl.⁵ .......................... G06F 7/38; G06F 7/52
[52] U.S. Cl. ..................................... 364/748; 364/757
[58] Field of Search .......................... 364/748, 754, 736

[56] References Cited

U.S. PATENT DOCUMENTS

| | | | |
|---|---|---|---|
| 4,338,675 | 7/1982 | Palmer et al. | 364/748 |
| 5,195,051 | 3/1993 | Palaniswami | 364/748 |

OTHER PUBLICATIONS

Wallace, C. S., "A Suggestion for a Fast Multiplier", IEEE Trans. Electron Comput. EC-13:14–17 (1964).
Dadda, L., "Some Schemes for Parallel Multipliers", Alta Freq. 34:349–356 (1965).
Dadda, L., "On Parallel Digital Multipliers", Alta Freq. 45:574–580 (1976).

*Primary Examiner*—Tan V. Mai
*Attorney, Agent, or Firm*—Albert C. Smith

[57] ABSTRACT

A structure of logic gates, partial product circuits, and a multiplier tree is described for multiplying of two operands which may contain denormalized numbers in the same amount of time as needed to multiply normalized numbers. The generation of the most significant bits ("hidden bits") of the significands of the operands from the operand exponents, and the production of the partial products that are dependent on these hidden bits, is accomplished in parallel with the generation of the partial products of the expressed bits of the significands of the operands and the first level of the multiplier tree. The fraction field partial products are input into the top level of a multiplier tree comprised of various order adders and wires. The hidden bit partial products are then input into the body of the multiplier tree instead of the top level. Additional adders are allocated to accommodate these additional inputs, but without lengthening the longest serial path from the top to the bottom of the multiplier tree. The result of the multiplier tree is summed and output. The parallel processing arrangement allows the identification and multiplication of denormalized numbers without any added delay due to the generation of the hidden bits.

12 Claims, 7 Drawing Sheets

METHOD AND APPARATUS FOR MULTIPLYING DENORMALIZED BINARY FLOATING POINT NUMBERS WITHOUT ADDITIONAL DELAY

RELATED APPLICATION

This application is related to application, Ser. No. 07/990,627, filed on Dec. 14, 1992 by Ted Williams, entitled MULTIPLIER TREE USING NINE-TO-THREE ADDERS, which is incorporated herein by reference.

BACKGROUND OF THE INVENTION

1. Field of the Invention

The present invention relates to arithmetic units for the multiplication of binary numbers, and more particularly, to methods and apparatuses for the multiplication of denormalized IEEE double precision binary floating point numbers.

2. Description of the Background Art

There are many logical structures for computing the arithmetic multiplication of binary numbers; such structures are generally known as multiplier trees. The overall task is the generation and summation of a large set of partial product bits, accounting for their binary weights. When used for floating point operations conforming to the IEEE Standard for Binary Floating-Point Arithmetic, (ANSI/IEEE Std. 754-1985, N.Y., The Institute of Electrical and Electronics Engineers, Inc., Aug. 12, 1985), multiplier trees must decode both normalized and denormalized numbers. A "normalized" number has the most significant bit of its fraction field equal to one; a "denormalized number" has the most significant bit of its fraction field equal to zero.

Because normalized numbers are the ordinary case, it is usually not necessary to explicitly specify the most significant bit. The most significant bit is therefore not part of the operand and is called the "hidden bit." The hidden bit is implied to be equal to one for all normalized numbers. Since denormalized numbers have a hidden bit of zero, there must be a way to determine when a number is denormalized without actually using an explicit bit of representation. The IEEE standard indicates a denormalized number by giving it an exponent value of zero, whereas all normalized numbers have exponents greater than zero. The hidden bit can therefore be directly determined by exponent. If the exponent is zero, the hidden bit of the fraction field of the operand is zero, otherwise it is one. Determining the value of the hidden bits is important because they contribute to the generation of partial products that must be summed by the multiplier tree during the multiplication operation.

Traditionally, multiplier trees have operated simultaneously on all of the partial products generated by the multiplication of the input operands. This required checking the exponent of the operands to generate the hidden bits of their fraction fields before generating the partial products to be input into the multiplier tree. This preliminary checking was needed because the hidden bit of each operand must be logically ANDed with each of the fraction field bits of the other operand in order to generate a complete set of partial products to be summed by the multiplier tree. The general structure for a multiply operation therefore has previously required that the logic generating the hidden bits function in series with the partial product generation logic, thereby increasing the total delays necessary to produce the final product. What is needed is an apparatus and a method for detecting whether the input operands are denormalized, and adding the hidden bit partial products to the fraction field partial products without adding any additional delay time to the multiplication of the input operands.

SUMMARY OF INVENTION

In accordance with the present invention the hidden bit for each input operand is generated from the operand's exponent, and the partial products of the hidden bits and the fraction fields are produced in parallel with the generation of the partial products arising from the fraction fields of the input operands and the first steps of summing these products. The detection process for denormalized numbers thus adds no additional delay in the multiplication of the input numbers.

Because of the different number of bits to be summed at each binary weight at each level of a multiplier tree, some of the adders within the tree structure may have unused inputs. All of the partial product bits that depend on the hidden bits are inserted into these unused adder inputs within the multiplier tree, rather than at the top of the tree with the bulk of the partial product bits. Because the tree structures feed product-carry terms between columns, the columns summing the bits of each given weight are not independent. Thus, a difficulty in utilizing unused adder inputs to minimize the overall tree propagation delay is determining where and how may extra adders are to be introduced at internal points in the multiplier tree without increasing the number of levels required to sum all of the bits.

By analyzing the spare adder inputs at each level of a 52 by 52 multiplier tree built with nine-to-three adders, a sufficient number of spare adder inputs are found between the first and second levels of adders to insert the 105 partial product bits generated from the hidden bits. This insertion allows the first level of adders to begin processing without waiting for the generation of partial products that depend on the hidden bits. Since the delay of the 11-input OR gates generating the hidden bits is slightly less than the delay of the first level of adders in the multiplier tree, the critical delay path goes through the partial product bits entering the top of the tree, and not through the extra partial product bits that enter between the first and second levels of the multiplier tree. This means that no delay is encountered in generating and processing the hidden bits and the partial products generated by the hidden bits. This logic structure can therefore properly handle both denormalized numbers and ordinary normalized numbers in the same time that would normally be required for handling numbers that were known to be normalized.

BRIEF DESCRIPTION OF THE DRAWINGS

Figure 4A:
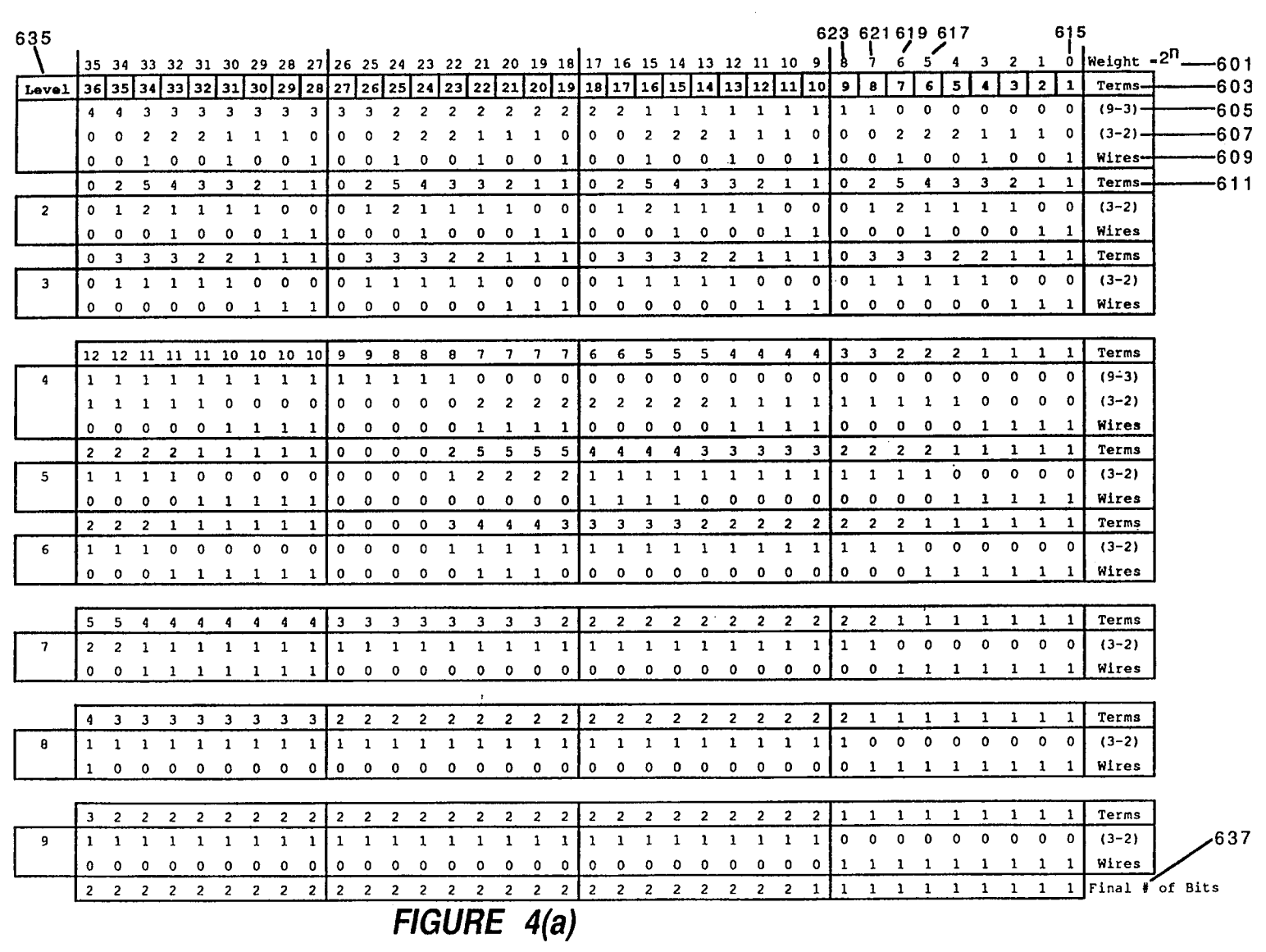
Figure 4B:
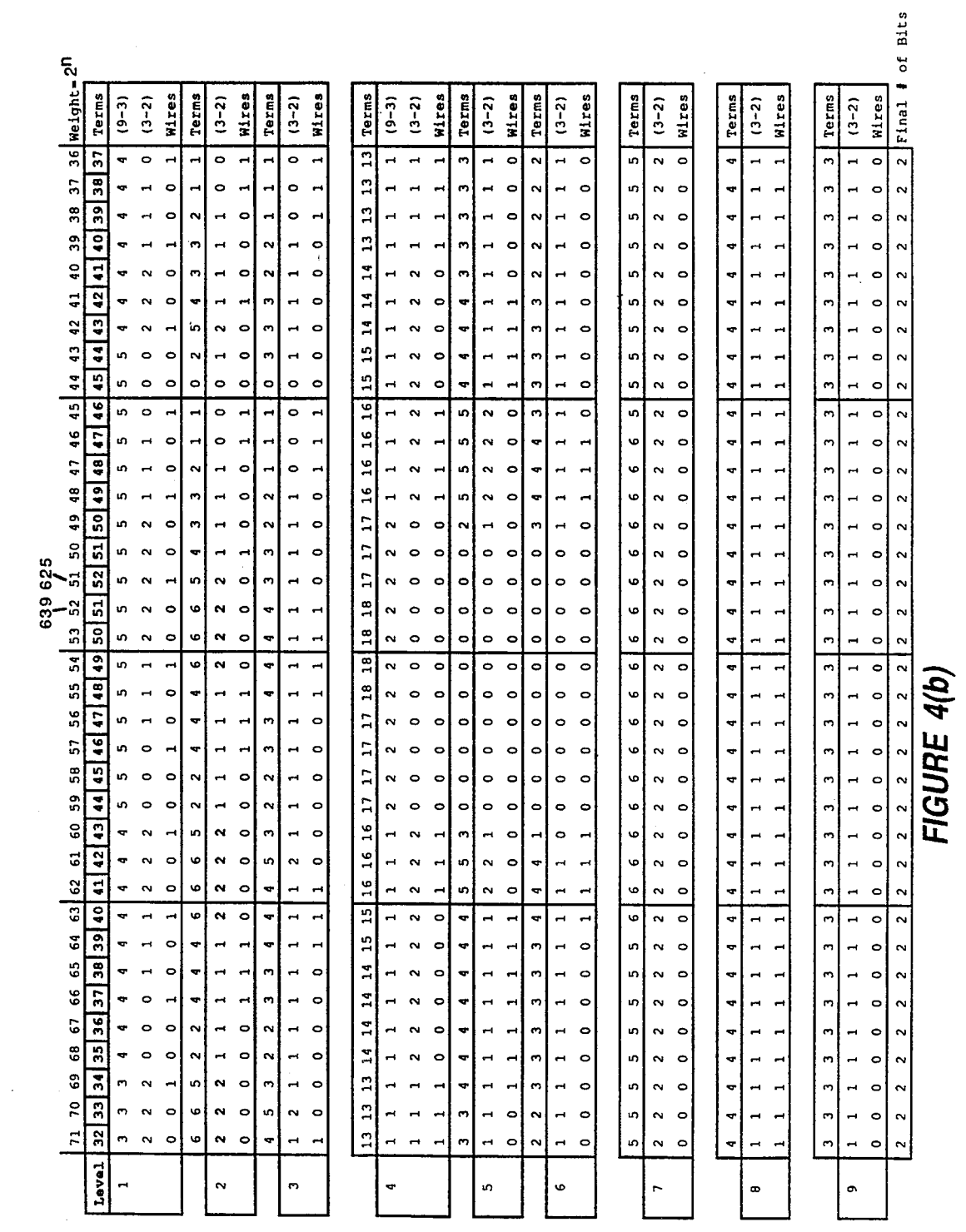
Figure 4C:
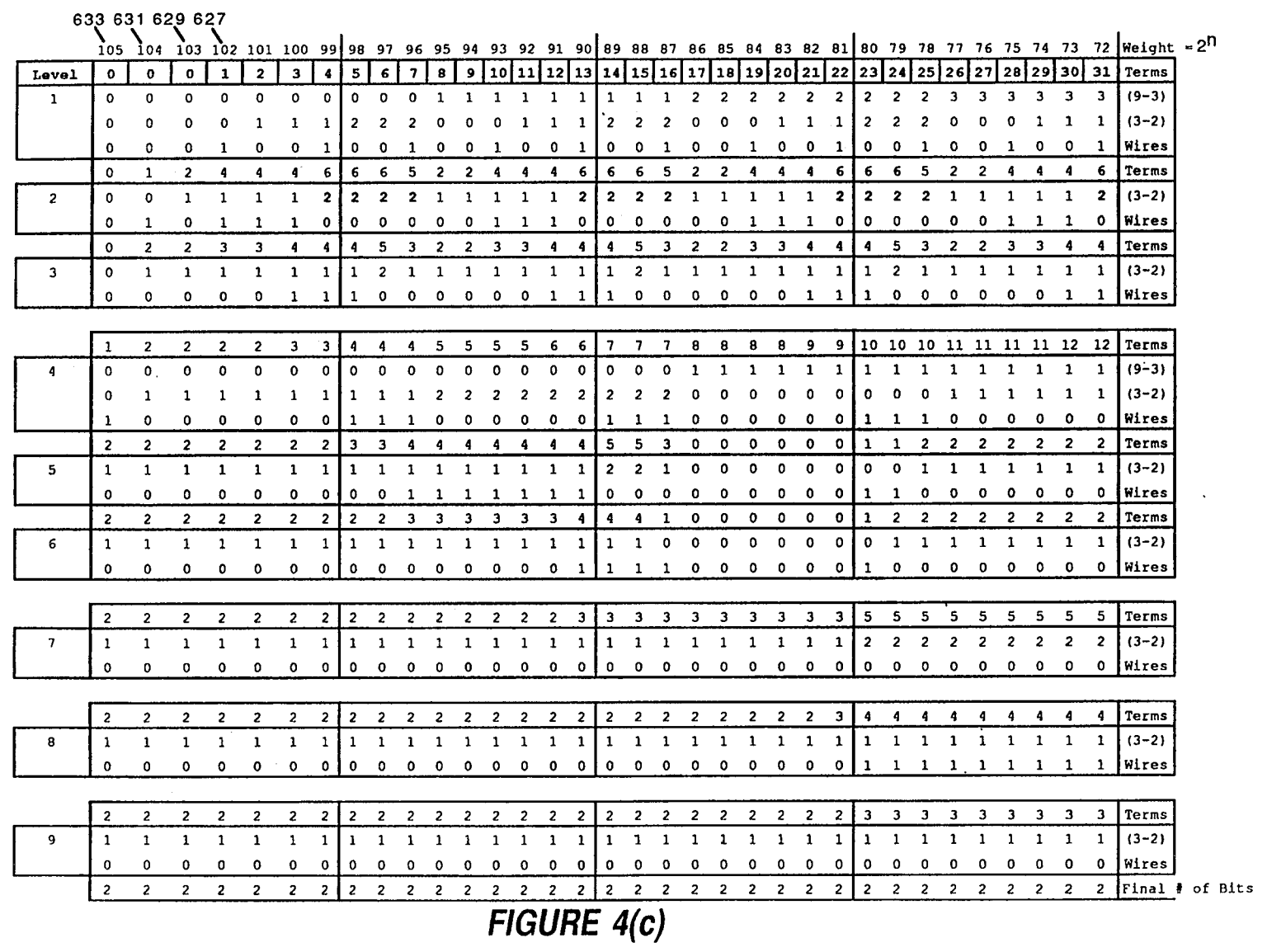

FIGS. 4(a)–(c) comprise a three-part table showing the an embodiment of multiplier tree 31, to allow for the inputting of the hidden bit partial products 30 into the side of multiplier tree 31 along bus 51.

DESCRIPTION OF THE PREFERRED EMBODIMENT

Figure 1:
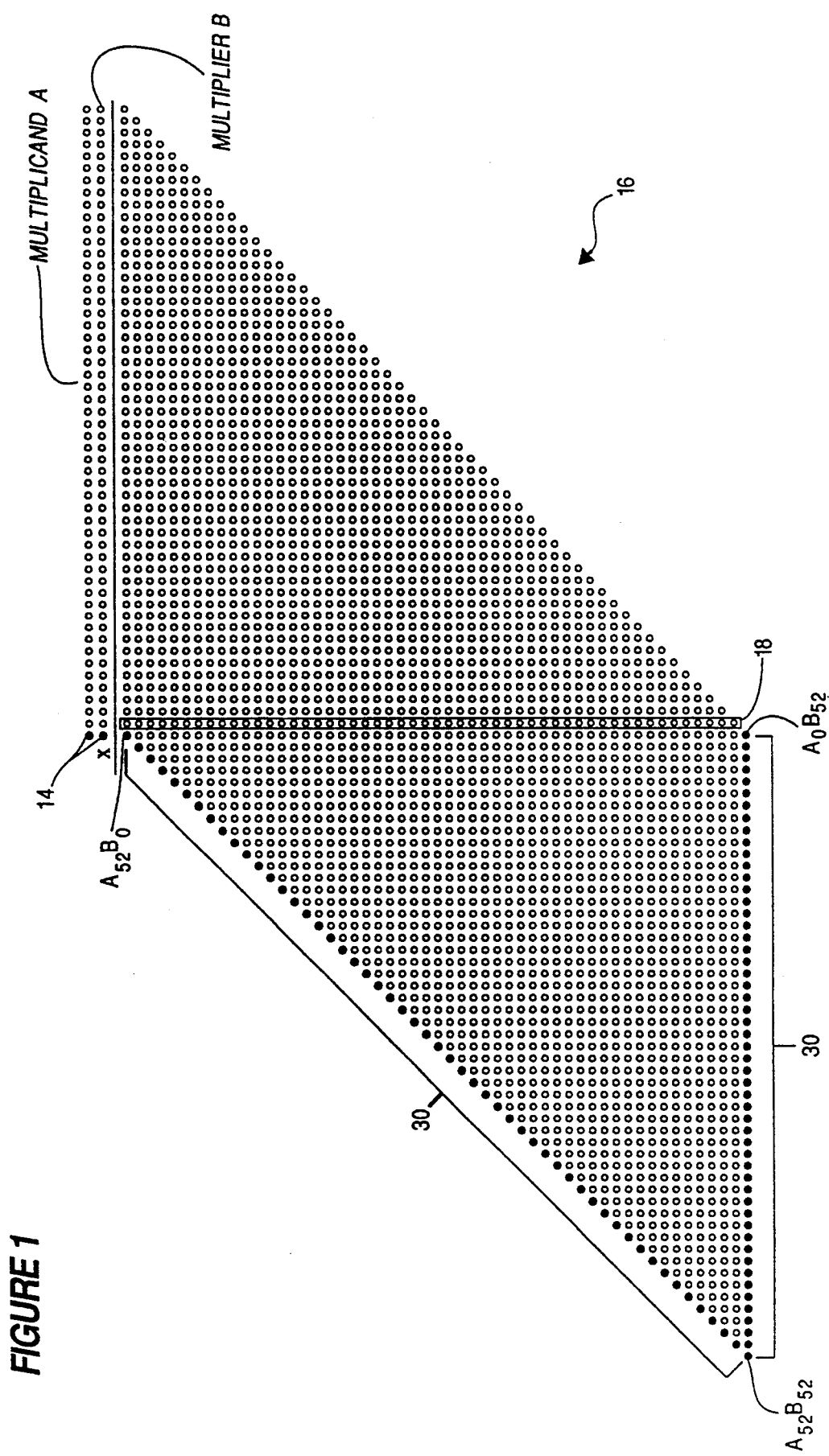
FIG. 1 is a pictorial representation illustrating the set of weighted partial product bits 16 created in the multiplication of two 52 bit operands A and B, including hidden bit partial products 30.

Referring now to FIG. 1, there is shown a pictorial representation of the multiplication and summation process according to the present invention. FIG. 1 is meant to aid the reader in understanding the apparatus and method of the present invention, but does not in itself demonstrate the present invention. Multiplicand A and multiplier B are represented in the two rows above the horizontal line. The hidden bits 14 of A and B are represented as the two black dots at the left end of A and B. The matrix below the line represents partial products 16 produced by the multiplication of each bit in A by each bit in B. Each row below the line is the product of ($B_i$) and ($A_{52} \ldots A_0$), where i equals integers from 0 to 52. The left column of hidden bit partial products 30 are those partial products 16 which arise from the multiplication of hidden bit 14 ($A_{52}$) and ($B_{51} \ldots B_0$). The bottom row represents the hidden bit partial products 30 of ($B_{52}$) and ($A_{51} \ldots A_0$). The present invention separately generates hidden bit partial products 30 from the generation of the remaining partial products 16, and inputs them separately from the partial products 16 into a multiplier tree.

Figure 2:
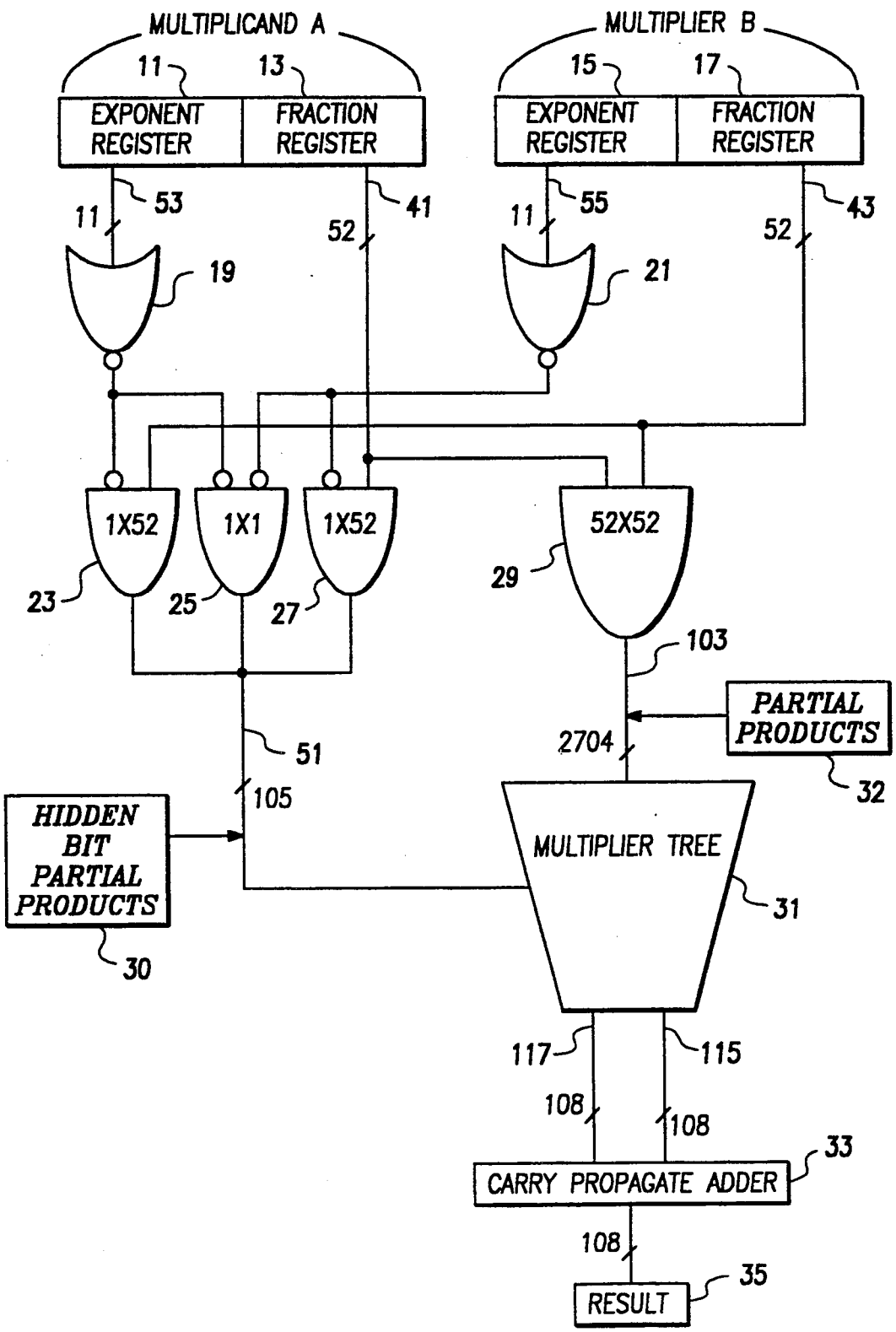
FIG. 2 is logic block diagram illustrating denormalized multiplier circuit 9 for generating hidden bit partial products 32 through NOR gates 19 and 21, and summing partial products 32 and hidden bit partial products 30 in multiplier tree 31.

Referring now to FIG. 2, there is shown the denormalized multiplier circuit 9 for detecting denormalized numbers in operands A and B, generating hidden bit partial products 30, and summing them together with the balance of partial products 16. Multiplicand A and multiplier B are input operands conforming to the IEEE standard representation for double precision floating point binary numbers. Exponent register 11 contains 11 bits representing the exponent of multiplicand A and fraction register 13 contains 52 bits representing the fraction of the multiplicand A. Exponent register 15 also contains 11 bits of the exponent of multiplier B, and 52 bits are stored in fraction register 17 as the fraction field of multiplier B.

NOR gate 19 has eleven inputs and is supplied with the contents of exponent register 11 along input lines 53, and determines if multiplicand A is denormalized by checking whether any of the exponent bits are set to 1. If A is denormalized, NOR gate 19 outputs a "1" along output line 57, otherwise a "0" is output. Likewise, NOR gate 21 has eleven inputs, and determines if multiplier B is denormalized from the input of exponent register 15 along input lines 55. The output of NOR gate 19 is inverted and input into partial product circuit 23, along with the contents of fraction register 17, which is the fraction field of multiplier B, along input lines 43. The inversion of the output of NOR gate 19 results in the most significant bit, hidden bit 14, of multiplicand A. Partial product circuit 23 performs the multiplication of the hidden bit 14 of multiplicand A with the fraction field of multiplier B, in a manner known in the art, producing hidden bit partial products 30 along bus 51. Correspondingly, the output of NOR gate 21 is inverted and input into partial product circuit 27, along with the contents of fraction register 13 from input lines 41. This operation results in the multiplication of the hidden bit 14 of multiplier B and the fraction field of multiplicand A, thereby producing additional hidden bit partial products 30, also along bus 51.

The outputs of both NOR gates 19 and 21 are inverted and fed into partial product circuit 25, which multiplies the hidden bits 14 of multiplicand A and multiplier B. The combined outputs of partial product circuits 23, 25, and 27 from the 105 hidden bit partial products 30, which are input into the side of multiplier tree 31 along bus 51. Concurrently with the generation of the hidden bit partial products 30, the contents of fraction register 13 and fraction register 17 are input into partial product circuit 29 along input lines 41 and 43. Partial product circuit 29 produces 2,704 partial products 32 from the fraction fields of multiplicand A and multiplier B.

The outputs of partial products circuits 23, 25, and 27 are all based on the hidden bits 14 of multiplicand A and multiplier B, and take the following form:

partial product circuit 23:

$$A_{52} * (B_{51} \cdot B_{50} \cdot \ldots B0) = A_{52}B_{51} \cdot A_{52}B_{50} \cdot \ldots \cdot A_{52}B_0 \quad \text{(Eq. 1)}$$

partial product circuit 27:

$$B_{52} * (A_{51} \cdot A_{50} \cdot \ldots A0) = A_{51}B_{52} \cdot A_{50}B_{52} \cdot \ldots A_0B_{52} \quad \text{(Eq. 2)}$$

partial product circuit 25:

$$A_{52} * B_{52} = A_{52}B_{52}. \quad \text{(Eq. 3)}$$

This sequence of testing, inversion, and multiplication determines whether multiplicand A and multiplier B are denormalized, and produces the hidden bit partial products 30. This sequence occurs in parallel with the generation of the partial products 32 of the fraction fields of multiplicand A and multiplier B and the first level of multiplier tree 31, and thus without any extra delay due to the detection of the hidden bits 14 and the generation of the hidden bit partial products 30.

The 2704 partial products 32 from partial product circuit 29 are input into multiplier tree 31 along bus 103. These 2704 partial products 32 are segregated into 103 sets of summands of identical weight, ranging from $2^0$ to $2^{102}$. Multiplier tree 31, described below, sums these partial products 32 accounting for their weights.

Hidden bit partial products 30 are input into multiplier tree 31 along bus 51 separately from the input of the partial products 32 along bus 103. Since the weight of each of the bits $A_iB_j$ of hidden bit partial products 30 equals $2^{(i+j)}$ (see equations 1–3, above), there are 52 pairs of hidden bit partial products 30 with the same weight, ($2^{52} \ldots 2^{103}$), and one hidden bit partial product 30 from partial product circuit 25 with weight $2^{104}$. These 105 hidden bit partial products 30 are input into multiplier tree 31 in a manner described below with respect to FIG. 3.

Multiplier tree 31 outputs two sums 36 and 37, each containing 106 bits. Sums 36, 37 are input into carry propagate adder 33 along buses 117 and 115, and are added together to produce a 106 bit number in result register 35, which comprises the fraction field of the final output.

Figure 3:
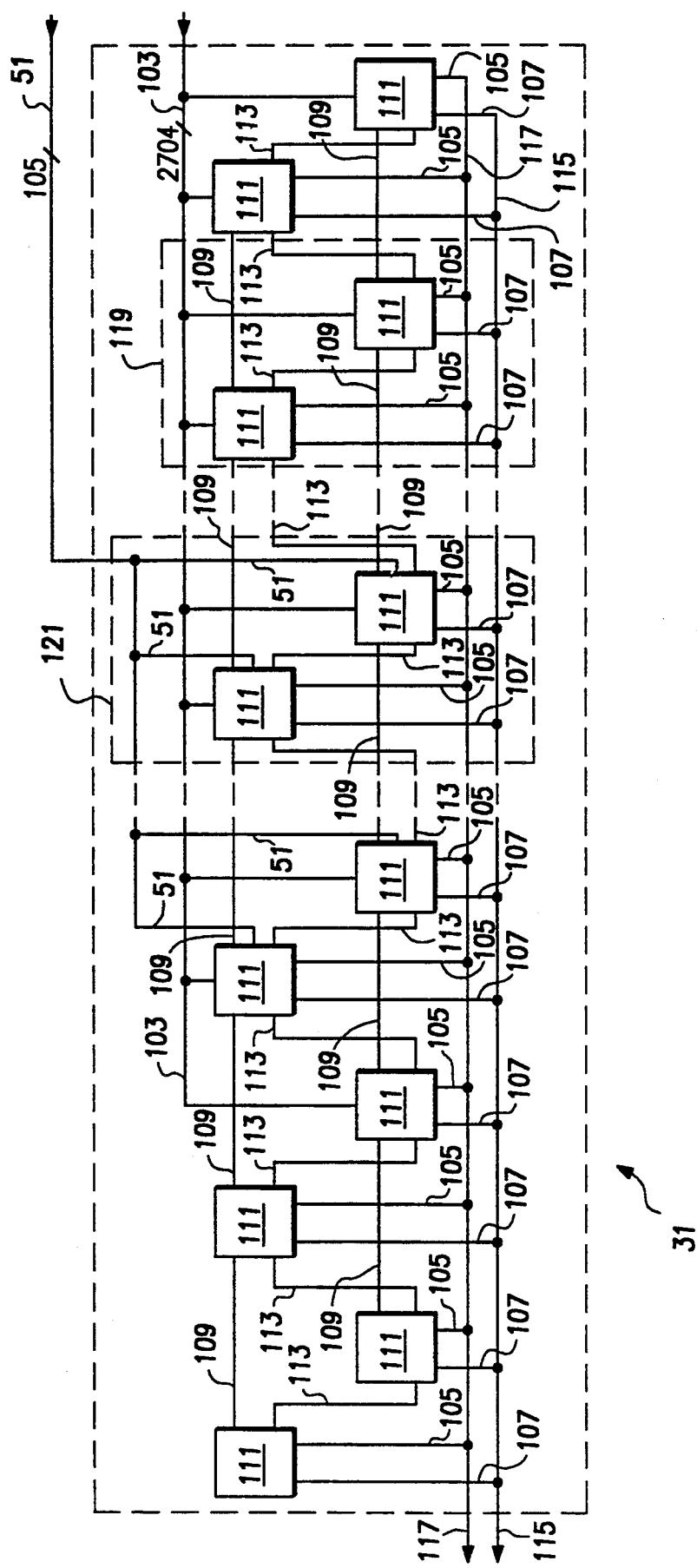
FIG. 3 is a logic block diagram illustrating multiplier tree 31 comprised of tree slices 111, accepting partial products 32 along bus 103 and hidden bit partial products along bus 51.

Referring now to FIG. 3, multiplier tree 31 is comprised of 106 tree slices 111. A "tree slice" is a set of bit adders dedicated to summing partial products 32 and carry bits all having the same binary weight. The first one hundred and three tree slices 111 are arranged to accept partial product 32 of weight $2^n$, where n equals 0 to 102, along bus 103. The remaining three tree slices 111 are allocated for carry bits between tree slices 111 and hidden bit partial products 30 input along bus 51. Boxed segment 119 contains two tree slices 111 with their couplings, and is repeated twenty-five times, resulting in the construction of the first fifty-two tree slices 111. These fifty-two tree slices 111 only accept as initial inputs partial products 32 along bus 103. Boxed segment 121 shows the fifty-third and fifty-fourth tree slices 111 which are further coupled to bus 51 for accepting hidden bit partial products 30 as inputs after accepting partial products 32 as inputs along bus 103. Segment 121 is repeated twenty-five times, with these tree slices all coupled to bus 51 in addition to bus 103.

As shown in FIG. 3, each tree slice 111 is numbered by the weight of the partial products 32 it accepts. Thus tree slice 111 numbered "0" accepts partial products 32 of weight 20, tree slice 111 numbered "1" accepts partial products 32 weighted $2^1$. The lower row of tree slices 111 accepts the evenly weighted partial 32 products, the upper row accepts the odd weighted partial products 32. Boxed segment 119, as repeated, thus shows the tree slices 111 in the upper row for partial products weighted $2^3$ to $2^{51}$, the lower row of tree slices 111 for partial products weighted $2^2$ to $2^{50}$. Boxed segment 121, as repeated, shows the tree slices 111 in the upper row for partial products weighted $2^{53}$ to $2^{101}$, the lower row of tree slices 111 for partial products weighted $2^{52}$ to $2^{100}$. Tree slice 111 numbered "102" accepts the the most significant bit weighted $2^{102}$. Tree slices 111 numbered "103" through "105" accept the hidden bit partial products 30 and the carry bit from prior tree slices 111. The construction and arrangement of multiplier tree 31 is more completely and generally described in the Related Application, *Multiplier Tree Using Nine-to-Three Adders*, filed concurrently herewith.

Each tree slice 111 accepts partial products 32 as inputs along bus 103, and sums partial products 32 through a number of "levels," where each level is equal to one adder delay based on the adders used to construct the tree slices 111, here carry save adders. The partial products 32 are distributed by their binary weights to the tree slices 111, each tree slice 111 allocated to sum the partial products 16 of a given binary weight, where the weights range from 0 to 107. Each of the tree slices 111 further accepts a number of carry inputs along buses 109 and 113 and produces carry outputs along the same buses. The tree slices 111 sum their inputs and output them to buses 117 and 115.

During each level of operation a set of partial products 30 is summed and output as a reduced set of partial products. Normally, all partial products 16 produced by the multiplication of the input operands are input into level one of multiplier tree 31 along bus 103. This arrangement, as discussed above, requires the denormalization logic to be in series with the partial product generation logic, increasing the number of adder delays to sum all the partial products.

In the present invention, partial products 32 are input into level 1 of the multiplier tree 31 along bus 103, but hidden bit partial products 30 are input separately into later levels of the tree along bus 51. In the preferred embodiment, hidden bit partial products 30 are input along bus 51 between level 1 and level 2. This separate input allows the detection of denormalized numbers and generation of hidden bit partial products 30 to occur concurrently with the generation of partial products 30 and their summation in level 1 of multiplier tree 31, and without adding any additional delay.

Various quantities of 9-3 adders 301 and CSAs 203 are allocated in each of the tree slices 111 depending on the number of partial product 32 input at each weight. As all hidden bit partial products 30 have weights equal to or greater than $2^{52}$, and these are the only partial products 16 not entering multiplier tree 31 during level 1, the construction of multiplier tree 31 for the first fifty-two tree slices 111 is as described in the related application.

However, because the hidden bit partial products 30 are separately input into multiplier tree 31 along bus 51 at level two or below, additional CSAs 203 are allocated at these levels as needed. As there are two hidden bit partial products 30 at each weight $2^{52}$ to $2^{104}$, an additional CSA 203, having three inputs, is allocated in level 2 in each tree slice 111 dedicated to these bit weights to accept these hidden bit partial products 30 where there are less than two unused inputs available in tree slice 111 to accept these additional inputs. Not every tree slice 111 gains a CSA 203 in this fashion since some tree slices 111 have extra unused inputs available in level 2. In some instance a wire is allocated, which effectively inputs the hidden bit partial product 30 into level 3. This allocation scheme is more completely described with respect to the discussion of FIGS. 4 (a)-(c) and 5, below. In an alternate embodiment, hidden bit partial products 30 can be distributed to the unutilized inputs of appropriately weighted CSAs 203 in each of the lower levels of multiplier tree 31, reducing the number of CSAs 203 that must be additionally allocated.

Referring now to FIGS. 4 (a), (b), and (c) ("FIG. 4"), an illustration is shown of the allocation and hierarchical arrangement of adders in multiplier tree 31 of FIG. 3. FIG. 4 shows the number of 9-3 adders 301, CSAs 203 and wires 251 needed to construct the preferred embodiment of multiplier tree 31 as diagrammed in FIG. 3. FIG. 4 is read as follows.

Top row 601 of the table shown in FIGS. 4(a)-(c) (FIG. 4) labeled "Weight=$2^n$" indicates for each tree slice 111 the bit weight of the partial products 32 to be summed in that tree slice 111. Reading from right to left, the bit weights range along top row 601 from 0 to 35 on FIG. 4(a), 36 to 71 on FIG. 4(b), and 72 to 105 on FIG. 4(c). On FIG. 4(a) column 615 represents the tree slice 111 for the least significant bit weight $2^0$ (shown on FIG. 3 as tree slice 111 numbered "0"). On FIG. 4(c), columns 627 represents the tree slice 111 for the most significant partial product 32 weighted $2^{102}$, which is the last partial product 32 to be input into the level 1 of multiplier tree 31. Columns 629, 631, and 633 represent tree slices 111 for carry bits weighted $2^{103}$, $2^{104}$, and $2^{105}$ respectively. These tree slices 111 accommodate carry-out bits generated during various levels of processing in the prior tree slices 111. Tree slices 111 in columns $2^{103}$ and $2^{104}$ also accept hidden bit partial products 30 along bus 51 (see tree slices 111 numbered "103" and "104" on FIG. 3).

The numbered columns across row 603 identify the number of partial products 32 input along bus 103 into the top level of each tree slice 111. These numbers correspond to the serial numbering of the tree slices 111 in FIG. 3. For example in FIG. 4(a), there is one partial product of weight $2^0$, and two partial products at weight $2^1$, representing the first two tree slices 111 in FIG. 3. FIG. 4(b) shows that the maximum number of partial products 32 input into multiplier tree 31 occurs in column 625, with fifty-two partial products of weight $2^{51}$ input into the fifty-second tree slice 111, as shown in FIG. 3 as the first tree slice 111 connected to bus 51. The structure of multiplier tree 31 at this point defines the critical time path for the overall summation process.

Row 605, labeled on the right as "9-3" indicates the number of 9-3 adders 301 used to sum partial products 32 in level 1. In the preferred embodiment, a 9-3 adder 301 is used when there are at least 8 partial products or "terms" to process, as seen in FIG. 4(a) in the columns 621 and 623 where there are 8 and 9 terms respectively.

Row 607, labeled on the right as "3-2" indicates the number of CSAs 203 allocated in level 1; the other rows so labeled indicate the number of CSAs 203 allocated in the subsequent levels. In FIG. 4(a), in column 619, where there are 7 partial products weighted $2^6$, two CSAs 203 are allocated. This leaves a single input, which as the next row 609 labeled "Wires" shows, is allocated a single wire.

Row 611, labeled "Terms" counts the number of outputs from the previous level 1, as the inputs to level 2. Continuing the example with column 619, there are 5 output terms: one each from the two CSAs 203 and wire in column 619, and one each from the carry bits from the two CSAs 203 in column 617. It is this line that reflects the addition of hidden bit partial products 30 input along bus 51 into the middle of multiplier tree 31. The other rows so labeled indicate the number of outputs from each previous level of processing as input to the next level.

Row 613 indicates the number of CSAs 203 allocated in level 2, and reflects (in boldface print) where additional CSAs 203 are allocated in level 2 to accommodate the hidden bit partial products 30.

Column 635, labeled "Level" and showing the numerals 1 through 9, refers to the processing levels in multiplier tree 31, as discussed above. The allocation of adders and wires in each of these levels in FIG. 4 corresponds to the allocation of adders in each level of multiplier tree 31 as discussed in the related application.

Row 637, labeled "Final # of Bits", shows the number of bits of each weight output from each tree slice 111 as output bits 105 and 107 (FIG. 3) for final summation in carry propagate adder 33. Row 637 shows that for all tree slices 111, and hence for all bit weights, the output is no more than two bits, corresponding to the two sums 36 and 37. Accordingly, multiplier tree 31 sums the entire body of partial products 16, including hidden bit partial products 30, resulting from the multiplication of two 52 bit operands in the same number of adder delays as a Wallace tree using conventional carry save adders, without lengthening the tree structure to accommodate the side input of the hidden bit partial products.

The allocation of additional CSAs in multiplier tree 31 is done as follows. Referring now to FIG. 4 (b), beginning at column $2^{52}$ and progressing to column $2^{103}$, two additional terms are added to the term line in row 611 before level 2. (See the discussion of steps 161 through 165 of FIG. 5, discussed below).

In column 625 weighted $2^{52}$ there are fifty-one partial products 32 to be summed. These inputs are allocated as follows:

| Inputs | | Outputs | |
|---|---|---|---|
| 5 (9-3 adders) | = 45 | (no output before level 2) | = 0 |
| 2 (CSAs) | = 6+ | (2) in col. $2^{51}$ + (2) in col. $2^{52}$ | = 4+ |
| | = 51 | | = 4 |

Without adding terms for the hidden bit partial products 30, there would only be four terms to be processed in level 2, which would require only a single CSA 203 and a wire 251. However, because there are two hidden bit partial products 30 of weight $2^{52}$, i.e., $A_{52}B_0$ and $A_0B_{52}$, two additional terms must be added in level 2, thus producing six input terms at this level. This means that an additional CSA 203 is allocated instead of a single wire 251. The allocation of an additional CSA 203 is continued for each tree slices 111 in columns $2^{53}$ to $2^{104}$ with an additional CSA allocated where are insufficient number of existing inputs available in level 2 in the CSAs 203 or wires 251 allocated on the basis of the outputs from level 1. The effects of these additional terms are propagated through the next levels down in multiplier tree 31.

However, the addition of CSAs 203 to accommodate the input of hidden bit partial products 30 does not increase the number of levels required for the summation of all the partial products 32 and hidden bit partial product 30. This is seen in the last term line of FIGS. 4 (a)-(c) which shows the final number of output bits from all levels. Even with the additional terms and CSAs 203, the entire set of partial product bits 16 is summed in nine levels, producing two numbers whose sum is the product of multiplicand A and multiplier B.

Accordingly, in the present invention the generation of the hidden bits 14 and the hidden bit partial products 30 occurs in parallel with the generation of the partial products 32 and the first level of processing of the multiplier tree 31. The addition of CSAs in the second level of tree slices 111 of multiplier tree 31 permits the summation of hidden bit partial products 30 with no additional time delays because no additional levels of adders are required. Therefore, the present invention is able to multiply denormalized numbers with no additional time delays due to the detection and processing of the denormalized condition.

Figure 5:
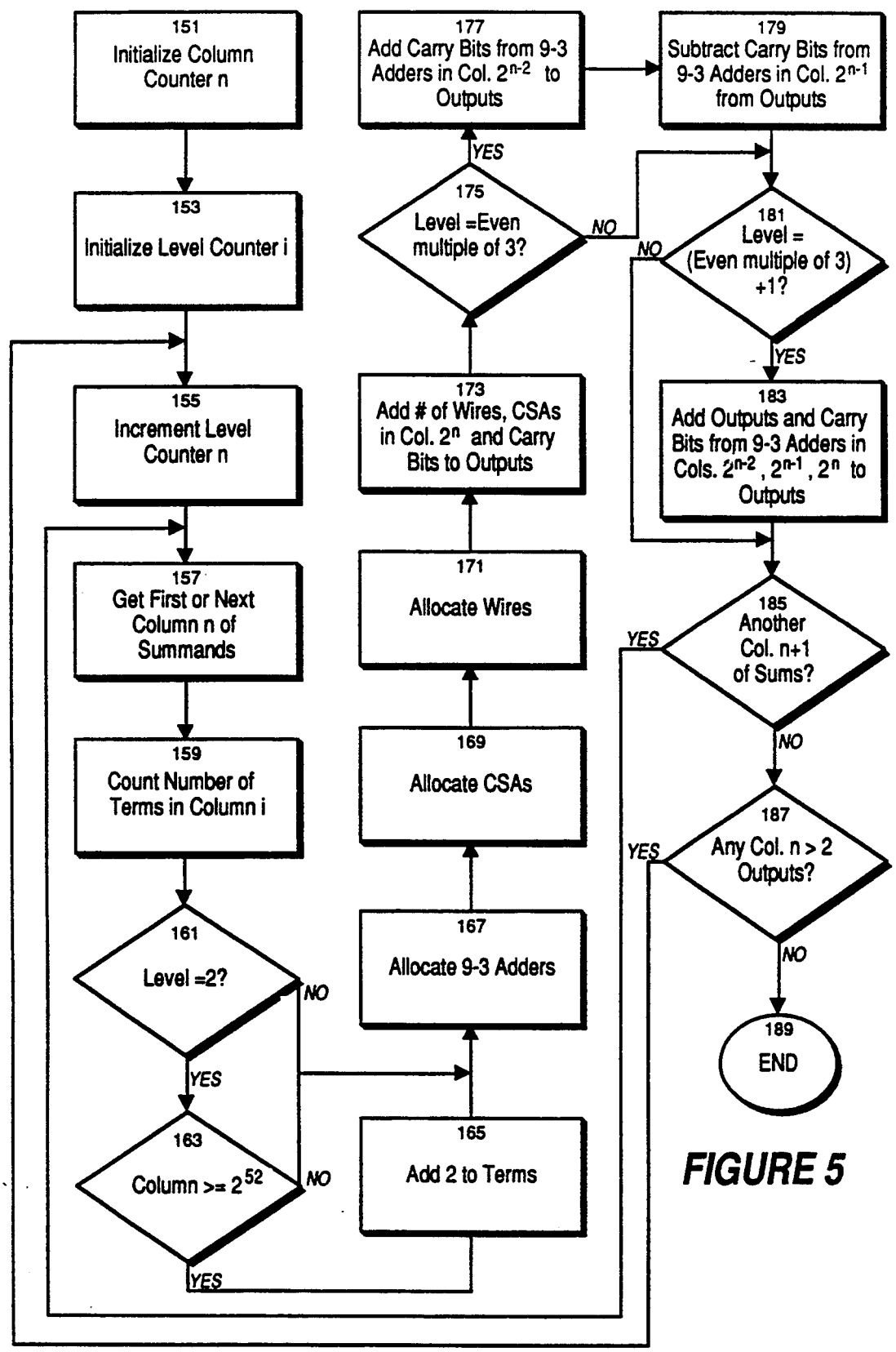
FIG. 5 is a flowchart illustrating the process of allocating the arithmetic adders used in the multiplier tree 31 to accept hidden bit partial products 32 into the side of multiplier tree 31.

Referring now to the flow chart of FIG. 5, a method is illustrated for allocating and hierarchically arranging the number of 9-3 adders 301, CSAs 203 and wires 51 in each of the tree slices 111 of multiplier tree 31. The method allocates adder units for multiplier 31 as detailed in FIGS. 4 (a)-(c).

The number n of summand columns of partial products 16 to be summed is set 151 to n=195, where n equals the length of the fraction field of multiplier B doubled, plus one. A counter for the number of levels i of adders to be placed in multiplier tree 31 is initialized 153 to 0. The level i counter is incremented 155 and a repetitive loop is begun for constructing each level of adders. A second repetitive loop is initiated for the values between one and n by accessing 157 the first or next columns to be summed, as identified by their weight, $2^{n-1}$. The number of partial products 32, or "terms" in this column is counted 159, where the terms in each column equals the minimum of either n or (104−n).

A test 161 determines whether the adders for a second level of multiplier tree 31 have been allocated. This is done because the hidden bit partial products 30 are input into multiplier tree 31 below the first level, and thus adders need only be allocated at the first level for the number of partial products 32 being supplied by partial product circuit 29 along bus 103. If the level i was determined 161 to be two, then a second test 163 determines whether the column being processed has a weight equal to or greater than $2^{52}$. If so, two additional terms are added 165 to the term count (except where the column weight equals $2^{104}$ in which case only one term is added). If not, no additional terms are added 165, and processing continues. This addition 165 of two terms to the number of terms accounts for the hidden bit partial products 30 that are input along bus 51 into the fifty-third tree slice 111 of multiplier tree 31 from partial product circuits 23, 25, 27. If the level i in was not level 2, then test 163 and addition 165 are skipped and processing continues.

Next, the number of highest order adders are allocated 167, here 9-3 adders by allocating p 9-3 adders, where p equals the integer component of the number m of partial products 32 plus 1, divided by 9. For example, in the preferred embodiment where 9-3 adders are used, if there are 43 terms to be summed in level 1, four 9-3 adders are allocated (p=integer of (43+1)/9), and these account for 36 terms (4×9 inputs).

After 9-3 adders are allocated 167, carry save adders are allocated 169 from the remaining number of inputs. Continuing the above example, there would be 43−36 =7 terms not accounted for in level 1, and these terms would be allocated to s CSAs, where s equals the greater of zero or the integer component of ((m−p*9+1)/3). Thus two CSA are allocated. This would leave one term unaccounted, for which w wires are allocated 171, where w equals the greater of zero or (m−p*9−s3).

The number of outputs of the above allocation of 9-3 adders, CSAs and wires are counted 173, as are the carry bits from the previous column $2^n-1$, to produce the number of terms output by the current level i. During this counting, each CSA and wire in the current level i of the current column $2^n$ contributes one output unit; each CSA in level i of the next lower weight column, $2^n$ contributes a unit from the carry bit.

The level i being processed is tested 175 for being an even multiple of three, and if so, then the terms input into level i+1 are adjusted with 1), one additional output unit added 177 for each 9-3 adder at level i in the second prior column $2^n-2$, and 2) and a unit is subtracted 179 for each 9-3 adder allocated at level i in the prior column $2^n-1$. These adjustments account first, for the carry bit from the 9-3 adder in column $2^{n-2}$ which produces an output of weight $2^{n+2}$ and which must be accounted for at column $2^n$; and second, for the carry bits which are consumed by one input to the 9-3 adders in the prior column $2^{n-1}$.

After these adjustments, if the current level i occurs 181 immediately after the completion of a level (i−1) equal to an even multiple of three, then one output unit is added 183 for each of the 9-3 adders in columns $2^{n-2}$ and $2^{n-1}$ of the current level i. This addition accounts for the carry bits from these 9-3 adders. Also, one unit is added 183 for each 9-3 adder in level i of current $2^n$ column. This accounts for the three outputs of 9-3 adders in level i whose weight equals $2^n$.

If there is another column n of partial products 32 and hidden bit partial products 30 to be summed 185, then the process continues by accessing 157 the next column of summands. Counter n will be exhausted when a column contains no remaining partial products 32, hidden bit partial products 30 separately input into multiplier tree 31, or carry bits from prior columns of adders. If no additional columns n are found, then all the adders for level i of multiplier tree 31 have been allocated.

The number of terms output in any column is compared 187 to two and if it is equal to or greater than two, then the level counter is incremented 155 to i+1, and another level of adders is allocated using the accumulated number of outputs as the input number of terms for the next level of adders. This looping thus determines the number of processing levels in multiplier tree 31, and the number and organization of 9-3 adders, CSAs, and wires necessary to sum the initial number of partial product bits 32 and hidden bit partial product 30 to produce two sums 36, and 37. When no column outputs more than two terms, the process stops 189.

The result of this process for constructing multiplier tree 31 is a description of the necessary number of 9-3 adders, CSAs and wires needed to produce two numbers the sum of which equals the product of the significands of multiplicand A and multiplier B. An example of such a description is found in FIGS. 4 (a)–(c).

I claim:

1. An apparatus for multiplying two binary floating point numbers, comprising:
   storage registers for storing first and second numbers containing exponent and fraction fields;
   hidden bit partial product generating means coupled to the storage registers for generating the hidden bit partial products dependent on the first and second numbers;
   partial product generating means coupled to the storage registers for generating the partial products of the fraction fields of the first and second numbers;
   a multiplier tree comprising a plurality of tree slices coupled to the partial product generating means for receiving and summing the partial products according to their binary weights, and further coupled to hidden bit partial product generating means for receiving the hidden bit partial product after receiving the partial products and summing the hidden bit partial products together with the partial products, and producing first and second sums, each tree slice containing a plurality of bit adders for summing the partial products and hidden bit partial products, the bit adders hierarchically arranged into a plurality of processing levels, number of levels being equal to or less than the number of levels needed for summing only the partial products; and
   a bit adder coupled to the multiplier tree for summing the first and second sums and producing a final sum equal to the product of the fraction fields of the first and second numbers.

2. The apparatus according to claim 1, the plurality of bit adders comprising:
   first plurality of logic means having a plurality of inputs for receiving and summing the partial products and a plurality of outputs; and
   second plurality of logic means having a plurality of inputs coupled to the outputs of the first plurality of logic means for receiving the summed partial products, and a plurality of inputs coupled to the hidden bit partial product generating means for receiving the hidden bit partial products, and summing the hidden bit partial products and the summed partial products producing first and second sums.

3. The apparatus of claim 2, wherein at least one tree slice comprises:
first, second and third carry same adders each having three inputs for receiving and summing the partial products having weight $2^n$, and two outputs, each carry same adder producing first intermediate output bit of weight $2^n$, and a second intermediate output bit of weight $2^{n+1}$, such that the sum of first and second intermediate output bits equals the sum of the received partial products;
a fourth carry same adder having inputs coupled to the outputs of first, second, and third carry save adders for receiving and summing first intermediate output bits, and having outputs, and producing a fourth intermediate output bit of weight $2^n$ and a fifth intermediate output bit of weight $2^{n+1}$, such that the sum of fourth and fifth intermediate output bits equals the sum of first intermediate output bits;
a fifth carry save adder having inputs coupled to the outputs of first, second, and third carry save adders for receiving and summing second intermediate output bits and having outputs, and producing another fifth intermediate output bit of weight $2^{n+1}$ and a carry-out bit of weight $2^{n+2}$ to be applied to a digital logic element in the multiplier tree, such that the sum of fifth intermediate output bit and the carry-out bit equals the sum of second intermediate output bits;
an inverting means having its input coupled to one output of the fourth carry save adder for receiving and inverting the fourth intermediate output bit, producing an inverted final output bit of weight $2^n$; and
a sixth carry save adder having inputs coupled to the outputs of fifth and fourth carry save adders for receiving fifth intermediate output bits, and coupled to a digital logic element in the multiplier tree for receiving a carry-in bit of weight $2^{n+1}$, summing the fifth intermediate output bits and the carry-in bit, and producing two final output bits of weight $2^{n+1}$ and $2^{n+2}$, such that the sum of all final bits and the carry-out bit equals the sum of the partial products bits and the carry-in bit; and such that the production of the carry-out bit is independent of the inputting of the carry-in bit.

4. The apparatus of claim 1, wherein at least one tree slice comprises:
first logic means having nine inputs for receiving and summing nine partial products, and having six outputs, and producing six primary output bits, such that the sum of which equals the sum of the nine partial products;
second logic means having six inputs coupled to the outputs of first logic means for receiving and summing the six primary output bits, and having four outputs producing a carry-out bit to be applied to a first bit adder logic means in the multiplier tree, and further producing three secondary output bits, such that the sum of the three secondary output bits and the carry-out bit equals the summation of the six primary output bits;
third logic means having three inputs coupled to the outputs of the second logic means for receiving and summing the three secondary output bits, having an input coupled to a second bit adder logic means in the multiplier tree for receiving a carry-in bit, and having three outputs, for summing the three secondary output bits and the carry-in bit producing three tertiary output bits, such that the sum of the three tertiary output bits and the carry-out bit equals the sum of the nine partial products and the carry-in bit, and such that the production of the carry-out bit is logically independent on the input of the carry-in bit; and
at least one fourth logic means having one input coupled to an output of the third logic means for receiving a tertiary output bit, having two inputs coupled to other bit adders in the multiplier tree for receiving carry-in bits, and having two outputs, for summing the tertiary output bit and the carry-in bits producing two final output bits.

5. The apparatus according to claim 1, wherein the multiplier tree comprises a plurality of tree slices, each tree slice further comprising:
a plurality of nine-to-three bit adders each having nine initial inputs for receiving nine partial products of weight $2^n$, and a carry-input for receiving a carry-in bit of weight $2^{n+1}$, a plurality of digital logic elements coupled to initial inputs for summing the partial products and the carry-in bit, and producing three primary output bits weighted values $2^{n+1}$, $2^{n+2}$ and $2^{n+3}$ and a carry-out bit weight $2^{n+2}$;
each nine-to-three bit adder further having three primary outputs coupled to the plurality of digital logic elements, and further coupled to a bit adding means in the multiplier tree to apply the three primary output bits;
each nine-to-three bit adder further having a carry output coupled to a digital logic element and a bit adding means in the multiplier tree to apply a carry-out bit of weight $2^{n+2}$, such that the sum of the primary output bits and the carry-out bit equals to the sum of the partial products and the carry-in bit.

6. An apparatus for multiplying two binary floating point numbers, comprising:
first and second exponent registers for storing the exponent values of first and second numbers;
first and second fraction registers for storing the fraction fields of first and second numbers;
first hidden bit logic means coupled to first exponent register for generating first hidden bit;
second hidden bit logic means coupled to second exponent register for generating second hidden bit;
first multiplier means coupled to first hidden bit logic means and second fraction register for multiplying first hidden bit and the fraction field of the second number producing hidden bit partial products;
second multiplier means coupled to second hidden bit logic means and first fraction register for multiplying second hidden bit and the fraction field of the first number producing additional hidden bit partial products;
third multiplier means coupled to first and second hidden bit logic means for multiplying first and second hidden bits producing additional hidden bit partial products;
fourth multiplier means coupled to first and second fraction registers for multiplying the fraction fields of first and second numbers producing additional hidden bit partial products;
a multiplier tree comprising a plurality of tree slices coupled to fourth multiplier means for receiving and summing partial products according to their binary weights, each tree slice comprising a plurality of bit adders hierarchically arranged into a plurality of processing levels;

the multiplier tree further coupled to first, second, and third multiplier means for receiving into the tree slices the hidden bit partial products according to their binary weights after receiving the partial products from the fourth multiplier means, the tree slices comprising additional bit adders for receiving and summing all hidden bit partial products with the summed partial products to produce first and second sums, the number of levels of all bit adders being equal to or less than the number of levels needed for summing only the partial products;

a bit adder coupled to the multiplier tree for receiving and summing first and second sums and producing a final product of first and second numbers; and a result register coupled to the bit adder for storing the final product.

7. The apparatus of claim 6, wherein at least one tree slice comprises:

first, second and third carry save adders each having three inputs for receiving and summing the partial products having weight $2^n$, and two outputs, each carry save adder producing first intermediate output bit of weight $2^n$, and a second intermediate output bit of weight $2^{n+1}$, such that the sum of first and second intermediate output bits equals the sum of the received partial products;

a fourth carry save adder having inputs coupled to the outputs of first, second, and third carry save adders for receiving and summing first intermediate output bits, and having outputs and producing a fourth intermediate output bit of weight $2^n$ and a fifth intermediate output bit of weight $2^{n+1}$, such that the sum of fourth and fifth intermediate output bits equals the sum of first intermediate output bits;

a fifth carry save adder having inputs coupled to the outputs of first, second, and third carry save adders for receiving and summing second intermediate output bits and having outputs, and producing another fifth intermediate output bit of weight $2^{n+1}$ and a carry-out bit of weight $2^{n+2}$ to be applied to a first digital logic element in the multiplier tree, such that the sum of fifth intermediate output bit and the carry-out bit equals the sum of second intermediate output bits;

an inverting means having its input coupled to one output of the fourth carry save adder for receiving and inverting the fourth intermediate output bit, producing an inverted final output bit of weight $2^n$; and a sixth carry save adder having inputs coupled to the outputs of fifth and fourth carry save adders for receiving fifth intermediate output bits, and coupled to a second digital logic element in the multiplier tree for receiving a carry-in bit of weight $2^{n+1}$, summing the fifth intermediate output bits and the carry-in bit, and producing tow final output bits of weight $2^{n+1}$ and $2^{n+2}$, such that the sum of all final bits and the carry-out bit equals the sum of the partial products bits and the carry-in bit, and such that the production of the carry-out bit is independent of the inputting of the carry-in bit.

8. The apparatus of claim 6, wherein a plurality of tree slices comprise:

first logic means having nine inputs for receiving and summing nine partial products, and having six outputs, and producing six primary output bits, such that the sum of which equals the sum of the nine partial products;

second logic means having six inputs coupled to the outputs of first logic means for receiving and summing the six primary output bits, and having four outputs, producing a carry-out bit to be applied to a first bit adder in the multiplier tree, and further producing three secondary output bits, such that the sum of the three secondary output bits and the carry-out bit equals the summation of the six primary output bits;

third logic means having three inputs coupled to the outputs of the second logic means for receiving and summing the three secondary output bits having an input coupled to a second bit adder in the multiplier tree for receiving a carry-in bit, and having three outputs, for summing the three secondary output bits and the carry-in bit producing three tertiary output bits, such that the sum of the three tertiary output bits and the carry-out bit equals the sum of the nine partial products and the carry-in bit, and such that the production of the carry-out bit is logically independent on the input of the carry-in bit; and at least one fourth logic means having one input coupled to an output of the third logic means for receiving a tertiary output bit, having two inputs coupled to at least one third bit adder in the multiplier tree for receiving carry-in bits, and having two outputs, for summing the tertiary output bit and the carry-in bits producing two final output bits.

9. A multiplier tree for summing $M_1$ through $M_y$ subsets of partial products, each subset containing m partial products resulting from a multiplication of two binary operands, the multiplier tree comprising:

$T_1$ through $T_y$ tree slices, each $T_i$ tree slice for $1 \leq i \leq (y-2)$ coupled to tree slices $T_{i+1}$, $T_{i+2}$, tree slice $T_{y-1}$ coupled to tree slice $T_y$, and tree slice $T_y$ coupled internally, and receiving the $M_i$ subset partial products of equal weight along an input bus, and including $L_1$ through $L_z$ levels of bit adders, each $L_j$ level for $1 \leq j \leq z$ for adding a $m_{i,j}$ subset of partial products comprising:

$p_{i,j}$ counter blocks each having n inputs, where n is a positive integer, coupled to receive n partial products of the $m_{i,j}$ partial products and having x outputs, $p_{i,j}$ equal to the integer component of $((m_{i,j}+1)/n)$, for summing the n partial products producing x output bits, each $p_{i,j}$ counter block in each level $L_j$ in each tree slice $T_i$ for $1 \leq i \leq (y-n+2)$ coupled to a $p_{i+1,j}$ counter block and a $p_{i+2,j}$ counter block to apply carry out bits;

$s_{i,j}$ carry-save adders, $s_{i,j}$ equal the greate of either zereo or the integer component of $(((m_{i,j}-p_{i,j}*n)+1)/3)$, each carry-save adder coupled to receive as inputs three partial products of the $m_{i,j}$ partial products, for summing the three partial products producing two output bits, the $s_{i,j}$ carry-save adders in each level $L_j$ in each tree slice $T_i$ coupled to a $s_{i+1,j}$ carry-save adder to apply carry out bits;

$W_{i,j}$ wires, $w_{i,j}$ equal to the greater of either zero or $(m_{i,j}-p_{i,j}*n-s_{i,j}* 3)$, each wire coupled to transmit one partial product of the $m_{i,j}$ partial products to a carry save adder in tree slice $T_i$ in level $L_{j+1}$ where there is output from each level $L_j$, $m_{i,j}$ partial products, $m_{i,j}$ equal to $(s_{i,j}+w_{i,j}+s_{i,j-1})$;

where at level $L_2$, the $m_{i,j}$ partial products equals $(m_{i,j}+2)$;

where each $p_{i,j}$ counter block further comprises d adder delays, wherein if equals a multiple of the d, then the $m_{i,j}$ partial products output from level $L_j$ includes $(p_{i,j-d+1}+p_{i-1,j-d+1}+p_{i-2,j-d+1})$ additional partial products; and if j equals a multiple of d, minus 1, then the $m_{i,j}$ partial products output from level $L_j$ includes $(m_{i,j}+p_{i-2,j-d+1}-p_{i-1,j-d+1})$ additional partial products.

10. A multiplier tree according to claim 9 wherein n, the inputs into each $p_{i,j}$ counter block equals nine, x, the outputs from each $p_{i,j}$ counter block, equals three, and d, the number of adder delays in a $p_{i,j}$ counter block, equals three.

11. An apparatus for multiplying a first and second binary floating point numbers, each number having an exponent and a fraction, comprising:

a hidden bit partial product generator for receiving the first and second numbers for generating hidden bit partial products dependent on the exponents of the first and second numbers;

a partial product generator for receiving the first and second numbers for generating partial products of the fraction fields of the first and second numbers;

a multiplier tree coupled to the partial product generator for receiving and summing the partial products according to their binary weights, and further coupled to the hidden bit partial product generator for receiving the hidden bit partial products after receiving the partial products, and summing the hidden bit partial products together with the partial products, and producing first and second sums; and a bit adder coupled to the multiplier tree for summing the first and second sums and producing a final sum equal to the product of the fraction fields of the first and second numbers.

12. The apparatus according to claim 11, wherein the multiplier tree comprises:

a plurality of first digital logic elements, each first digital logic element having at least one input coupled to the partial product generator for receiving and summing the partial products, and having and at least one output; and a plurality of second digital logic elements each second digital logic element having at least one input coupled to at least one output of a first digital logic element for receiving the summed partial products, and a at least one input coupled to the hidden bit partial product generator for receiving the hidden bit partial products, for summing the hidden bit partial products and the summed partial products and producing the first and second sums.

* * * * *